United States Patent [19]

McKinstry et al.

[11] Patent Number: 5,566,639
[45] Date of Patent: Oct. 22, 1996

[54] ANIMAL WATERER WITH QUICK DISCONNECT AND VALVE ALIGNMENT FEATURES

[75] Inventors: James E. McKinstry; Billy L. Denny, both of Cedar Rapids, Iowa

[73] Assignee: Nelson Manufacturing Company, Cedar Rapids, Iowa

[21] Appl. No.: 464,096

[22] Filed: Jun. 5, 1995

[51] Int. Cl.⁶ .................................................. A01K 7/04
[52] U.S. Cl. .................................................. 119/78; 119/74
[58] Field of Search .................................. 119/79, 80, 72, 119/74, 78

[56] References Cited

U.S. PATENT DOCUMENTS

| | | | |
|---|---|---|---|
| 2,614,532 | 10/1952 | Steel | 119/78 |
| 3,650,247 | 3/1972 | McKinstry | 119/81 |
| 4,426,956 | 1/1984 | McKinstry | 119/72 |
| 4,586,532 | 5/1986 | Tsolkas | 119/79 X |

Primary Examiner—Robert P. Swiatek
Assistant Examiner—Yvonne R. Abbott
Attorney, Agent, or Firm—Hill, Steadman & Simpson

[57] ABSTRACT

An improved animal waterer which has a stainless steel bowl formed with an upper rim in which are mounted two extending pins with heads that extend through key-shaped openings in a locking bar. The locking bar can be moved from the locked to the unlocked positions so that the bowl may be locked or unlocked from the waterer. the water valve and float are connected to the waterer with an alignment opening and nut so that the valve and float arm maintain proper alignment.

5 Claims, 2 Drawing Sheets

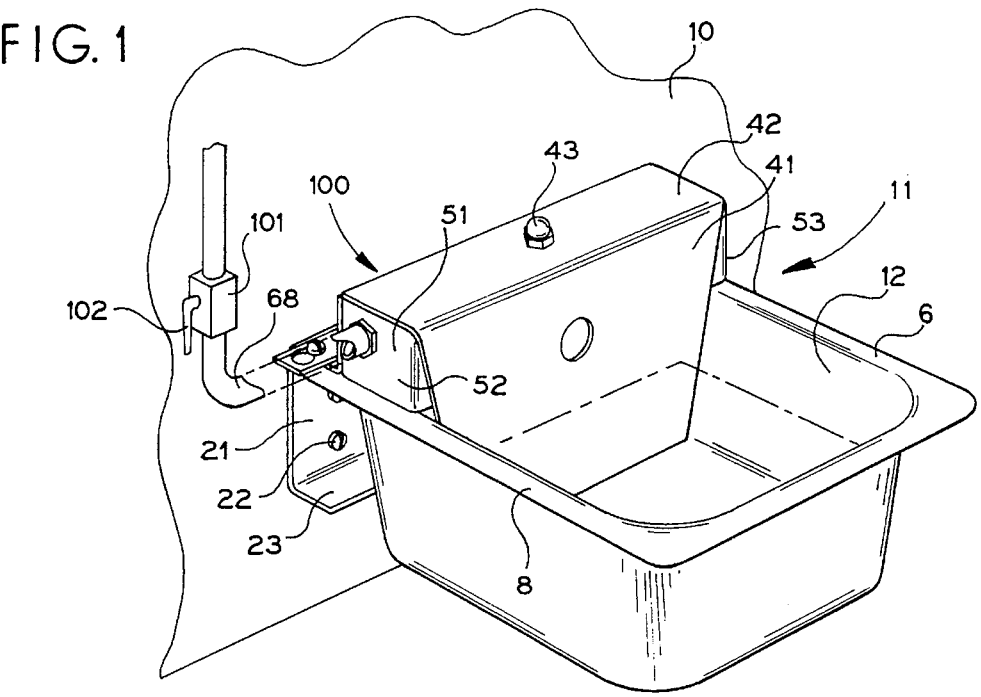
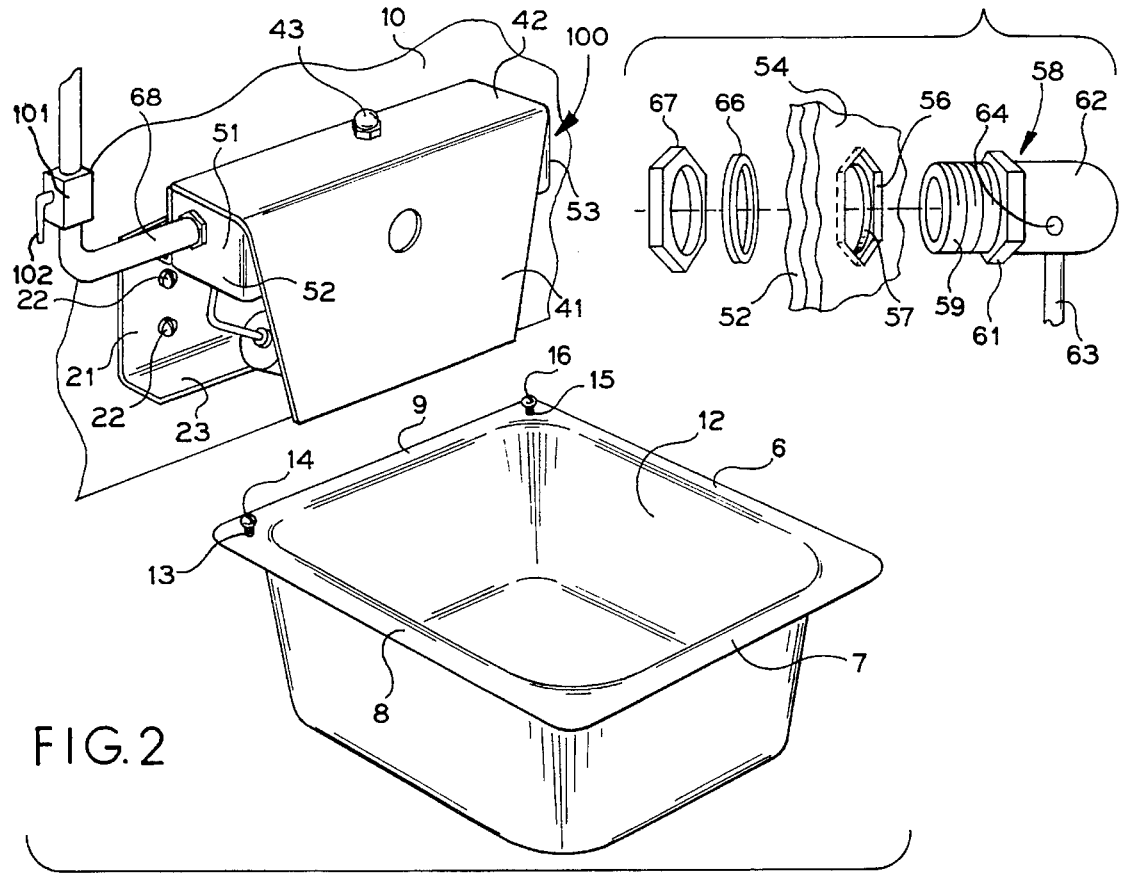

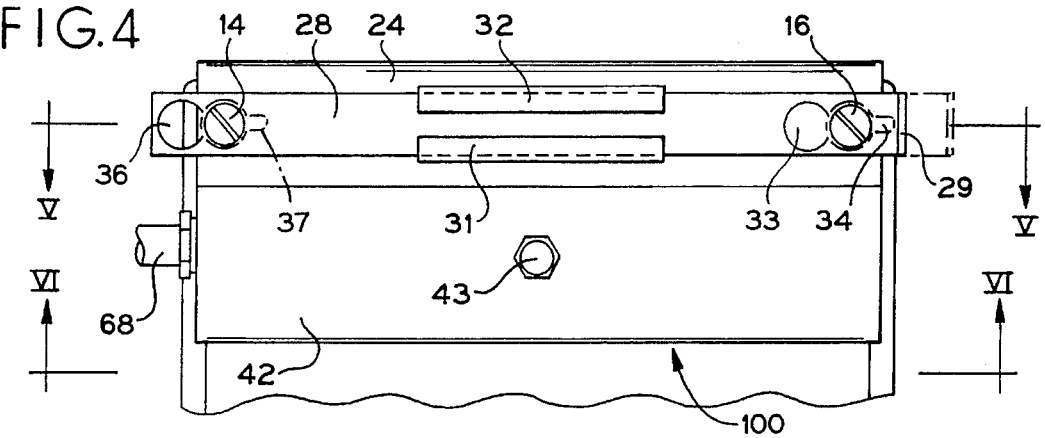
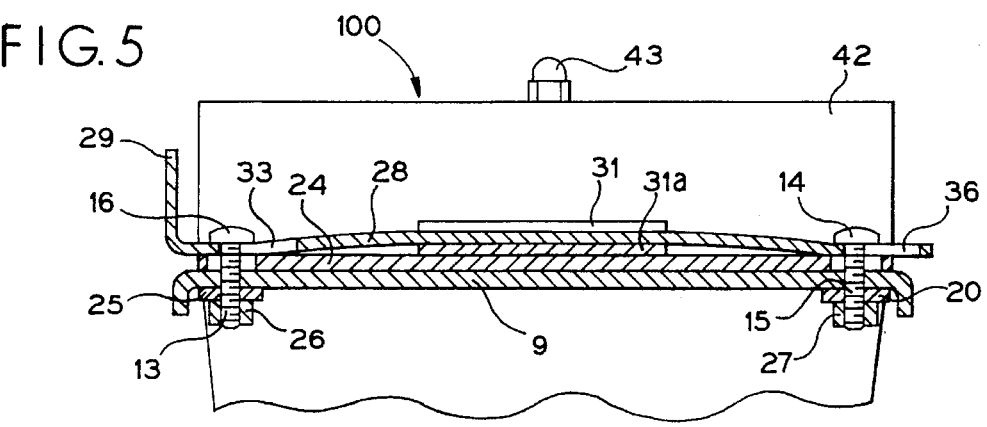
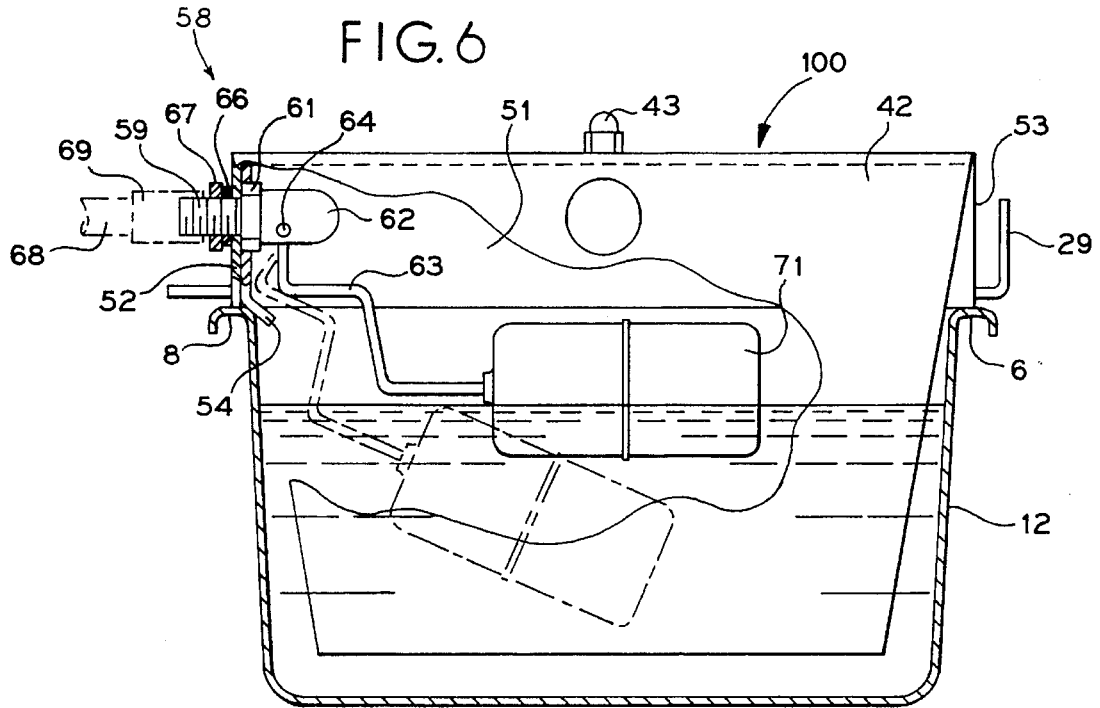

5,566,639

ANIMAL WATERER WITH QUICK DISCONNECT AND VALVE ALIGNMENT FEATURES

BACKGROUND OF THE INVENTION

1. Field of the Invention

This invention relates in general to animal waterers and in particular to an improved structure.

2. Description of the Related Art

A number of animal watering devices are known such as shown in U.S. Pat. Nos. 3,650,247 and 4,426,956.

SUMMARY OF THE INVENTION

The present invention provides an animal waterer which allows the watering bowl to be connected and disconnected from the valve and supporting unit in a novel manner.

Another feature of the invention is to provide a connection for the water inlet valve which assures that the valve will not rotate relative to the unit.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a perspective view of the improved waterer of the invention;

FIG. 2 is an exploded view of the waterer of the invention showing the bowl separated from the valve unit;

FIG. 3 is a detail exploded view illustrating the mounting structure for the valve;

FIG. 4 is a top partial plan view of the invention;

FIG. 5 is a sectional view taken on line V—V from FIG. 4; and

FIG. 6 is a sectional view taken on line VI—VI from FIG. 4.

DESCRIPTION OF THE PREFERRED EMBODIMENTS

The FIGS. illustrate the automatic animal waterer of the invention which might, for example, be used for dogs or other animals and which may be mounted in a kennel so as to provide a constant supply of fresh water and eliminates the time consuming task of refilling water bowls. The invention saves on the expense of replacing damaged water bowls and conserves water. The invention may be of rugged stainless steel construction with both the drinking bowl and the wall bracket being made of heavy duty corrosion resistant stainless steel. The float valve may be made of brass with a tough polypropylene float. The waterer of the invention can be quickly and easily cleaned by disconnecting the stainless steel drinking bowl. The water line may be connected to either side of the waterer. As shown in the FIGS., the waterer 11 of the invention is shown connected to a wall 10, although it is to be realized that the back bracket 100 may also be mounted to a pole by the use of a suitable pole mounting bracket rather than to a wall.

A bowl 12 has upper rims 6, 7, 8 and 9 as shown in FIG. 2. A pair of upwardly extending bolts 13 and 15 as shown in FIGS. 2 and 5, which respectively have enlarged heads 14 and 16. The lower end of the bolts 13 and 15 are threadedly received in nuts 26 and 27 as best shown in FIG. 5, and the nuts 26 and 27 are attached to plates 25 and 20 which are welded or otherwise connected to the rim 9 of the bowl 12 so that the bolts 13 and 15 remain in a fixed position with the heads 14 and 16 a fixed spaced distance from rim 9.

The back bracket 100 includes a back planar portion 21 which is formed with openings through which wall attaching screws 22 are received for attaching the back bracket to a wall 10. A lower ledge 23 is connected to the member 21. The back bracket 100 has an upper horizontally extending portion 24 to which is attached a guide bracket 31a which has its opposite ends 31 and 32 bent inwardly so as to provide a guide for a locking slide 28. The locking slide 28 has a handle 29 at one end and is formed with keyshaped openings which have enlarged portions 33 and 36 which are larger than the heads 14 and 16 of the bolts 13 and 15. The key-shaped openings also have smaller portions 34 and 37 which are smaller than the heads 14 and 16 of the bolts 13 and 15 such that as shown in the solid line position in FIG. 4, when the slide 28 is moved to the left locking position the narrow portions 34 and 37 lock the bowl 12 to the back bracket 100. When the locking bar 28 is moved to right relative to FIG. 4 so that the heads 14 and 16 of the bolts 13 and 15 are aligned with the larger openings 33 and 36, the bowl 12 can be removed from the back bracket 100. This position is illustrated in the dashed line position of FIG. 4. The back bracket 100 has an upper portion 51 that has ends 52 and 53 which are each formed with openings for mounting a water valve 58 that connects to a water line 68. Openings are formed in each of the ends 52 and 53 so that the water line may be mounted on either side of the back bracket 100 of the waterer.

In the illustrated example, the water valve 58 is mounted in the end 52 and is shown in detail in FIG. 3. The end 52 is formed with a round opening 57 and a plate 54 is welded or otherwise attached to the end 52 and is formed with a hexagonal opening 56 aligned with the round opening 57. The valve 58 has a threaded portion 59 which extends through the openings 57 and 56 and has a hexagonal head 61 which fits within the hexagonal opening 56 so as to prevent the valve 58 from rotating relative to the member 54 and the end 52. The valve housing 62 has a pivot pin 64 which pivotally supports a float arm 63 upon which is mounted a float 71 as best shown in FIG. 6. The float arm 63 opens and closes a valve in the valve housing 62 as the float 71 controls the position of the arm 63. The valve turns on and turns off the water from the water supply line 68 so that the bowl 12 fills to the level shown in FIG. 6 where the float rremoves the arm 63 to the turn-off position and as water from the bowl 12 is used by the animals, the float 71 moves down to the dashed dot position shown in FIG. 6 which moves the arm 63 to the turn-on position of the valve. A washer 66 passes over the threaded portion 59 of the valve 58 and a nut 67 is threadedly received on the threaded portion 59 so as to firmly attach the valve 58 to the wall 52 so that it cannot rotate due to the hexagonal opening 56 in the member 54.

A generally L-shaped cover member 41 has a top portion 42 formed with an opening through which a threaded lead screw, not shown extends, and a covered acorn nut 43 is receivable on the lead screw so as to lock the cover member 41 to the upper portion 51 of the back bracket 100. The lead screw is attached to the upper portion 56. A valve 101 is mounted in the supply line 68 and has a handle 102 which allows the water supply to the water line 68 to be turned on and off. In use, when it is desired to clean the bowl 12, the valve handle 102 is turned to the off position to close the valve 101, and the locking slide bar 28 is moved to the unlocked position by the handle 29 so that the heads 14 and 16 can move through the enlarged openings 33 and 36 of the locking bar 28 and the bowl 12 can be removed from the back bracket 100. The bowl can then be cleaned and replaced on the back bracket 100 by inserting the bolt heads 14 and 16 through the enlarged openings 33 and 36 after which the handle 29 of the locking bracket 28 is moved to the locked position shown in FIG. 4 to lock the bowl 12 to the back bracket 100. Then the valve 101 may be opened by moving the handle 102 to the open position, and water will flow through the water line 68 until the float 71 moves to the turn off position illustrated in solid line in FIG. 6.

Due to the alignment arrangement illustrated in exploded view FIG. 3, the valve 58 will maintain its orientation and the arm 63 of the float 71 will not rotate out of the vertically aligned position, since the hexagonal opening 56 locks the hexagonal head 61 of the valve unit 58 in a fixed alignment. This makes it unnecessary to rebend and readjust the float 71 and arm 63.

It is seen that this invention provides an improved automatic animal waterer and although the invention has been described with respect to preferred embodiments, it is not to be so limited as changes and modifications can be made therein which are within the full intended scope of the invention as defined by the appended claims.

We claim as our invention:

1. An animal waterer comprising:

a watering bowl, a pair of spaced upwardly extending pins attached to an upper edge of said watering bowl and each of said pins formed with an enlarged head, a valve assembly, a locking means movably mounted on said valve assembly and formed with two generally key-shaped openings with larger portions through which the heads of said pins of said watering bowl can be inserted when the locking means is in a first position, and wherein said locking means can be moved to a second position to lock said watering bowl to said valve assembly.

2. An animal waterer according to claim 1 wherein said locking means is a slide which is longitudinally movable relative to said valve assembly between said first and second positions.

3. An animal waterer according to claim 2 including a handle on said slide.

4. An animal waterer according to claim 1 wherein said valve assembly includes a back bracket and valve with a float arm and a float attached thereto and said valve has a non-round portion that extends through a non-round opening in said back bracket so as to prevent said valve from moving relative to said back bracket.

5. An animal waterer according to claim 4 wherein said non-round portion and said non-round opening are hexagonal.

\* \* \* \* \*